United States Patent [19]

Ishiguro et al.

[11] Patent Number: 4,765,201

[45] Date of Patent: Aug. 23, 1988

[54] CONTROL METHOD OF AUTOMATIC TRANSMISSION FOR AUTOMOBILES WITH EXHAUST BRAKE

[75] Inventors: Toshiaki Ishiguro, Nagoya; Shigeo Takahashi, Anjo, both of Japan

[73] Assignee: Aisin Seiki Kabushiki Kaisha, Kariya, Japan

[21] Appl. No.: 912,371

[22] Filed: Sep. 29, 1986

[30] Foreign Application Priority Data

Sep. 30, 1985 [JP] Japan .................... 60-216972

[51] Int. Cl.$^4$ ............................ B60K 41/10
[52] U.S. Cl. ............................ 74/866; 192/1.23
[58] Field of Search ............ 192/1, 3 R, 3 TR; 74/866, 865, 877; 123/323; 188/273

[56] References Cited

U.S. PATENT DOCUMENTS

| | | | |
|---|---|---|---|
| 2,895,571 | 7/1959 | Hanebeck | 192/3 TR X |
| 4,036,340 | 7/1977 | Hufendiek | 188/273 X |
| 4,061,215 | 12/1977 | Ishikawa | 192/3 TR X |
| 4,106,584 | 8/1978 | Matsubara | 188/273 X |
| 4,350,234 | 9/1982 | Suga et al. | 192/1 X |
| 4,553,648 | 11/1985 | Suzuki et al. | 188/273 |
| 4,557,233 | 12/1985 | Joppig et al. | 123/323 |
| 4,614,258 | 9/1986 | Fukanaga | 192/0.09 X |
| 4,630,507 | 12/1986 | Kugler et al. | 74/862 X |

FOREIGN PATENT DOCUMENTS 5980561 10/1982 Japan .

Primary Examiner—Leslie A. Braun
Assistant Examiner—Dwight G. Diehl
Attorney, Agent, or Firm—Burns, Doane, Swecker & Mathis

[57] ABSTRACT

A control method of an automatic transmission for an automobile with exhaust brake provided, which includes a control signal given from an exhaust brake control arrangement, if a sensor indicates that the degree of throttle opening is zero and if a judging arrangement indicates that the downshift point is not yet passed over, downshift is performed by an automatic speed change, whereby the engine brake in addition to the exhaust brake is made effective to thereby secure a large braking force.

1 Claim, 4 Drawing Sheets

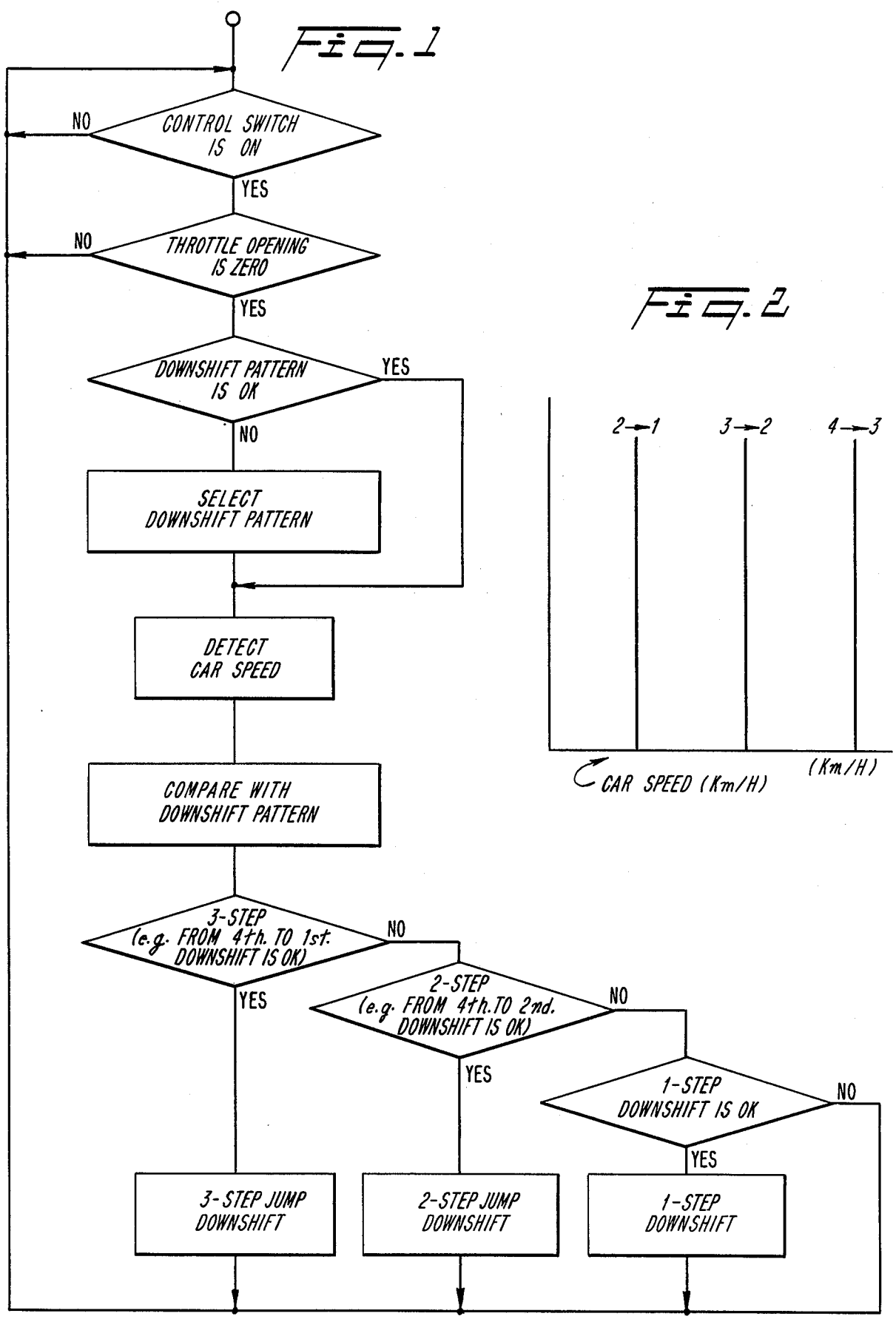

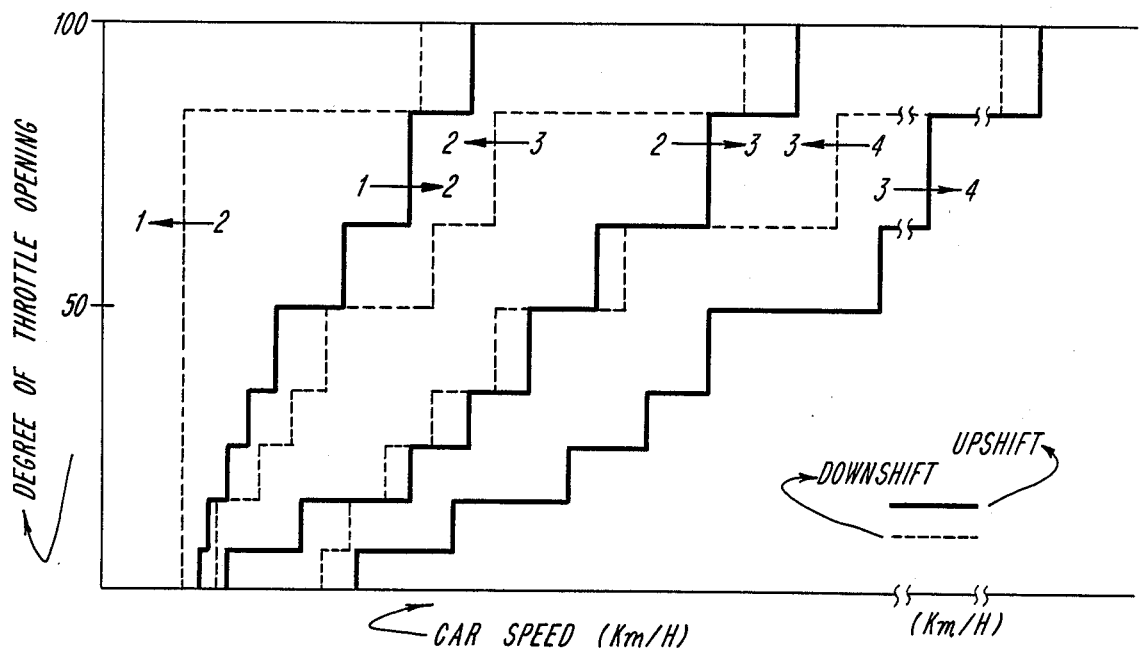
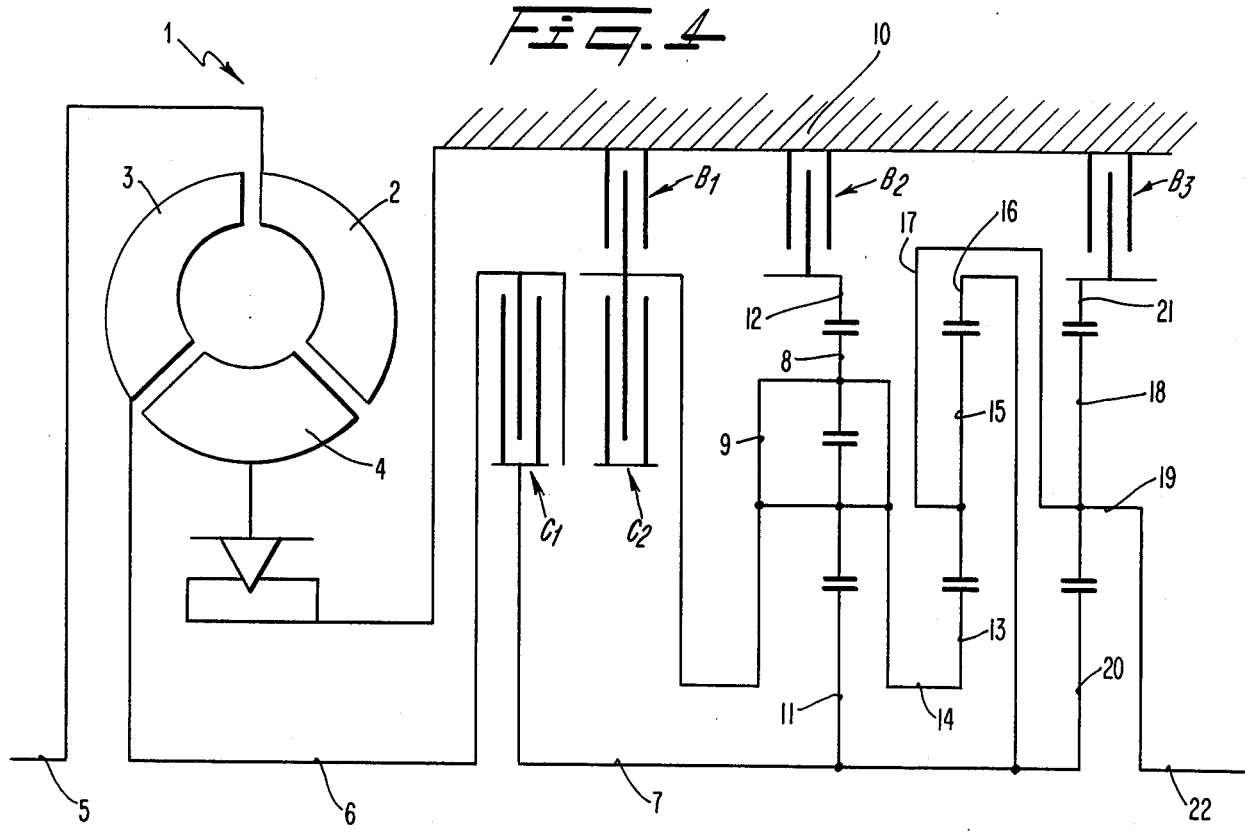

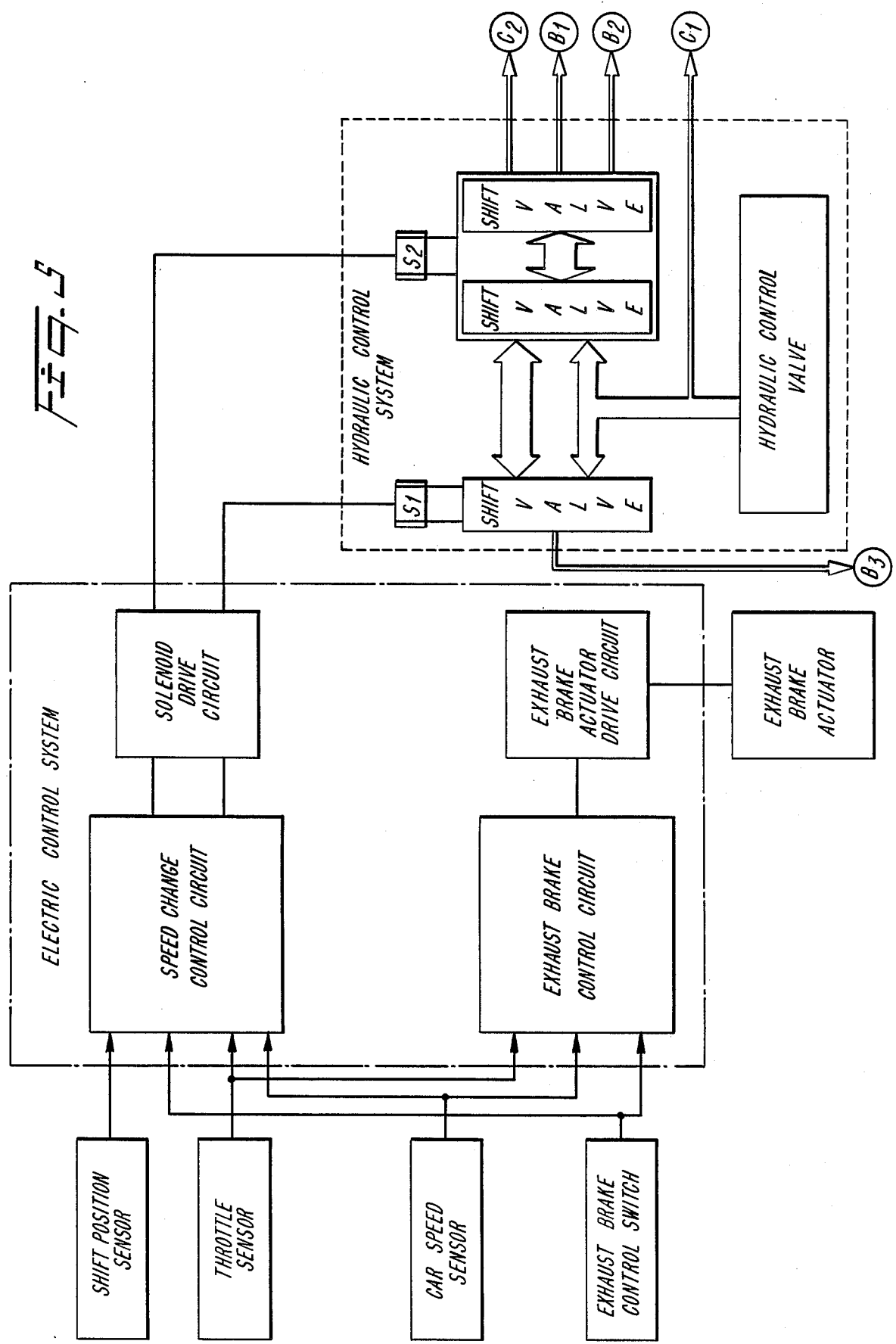

CONTROL METHOD OF AUTOMATIC TRANSMISSION FOR AUTOMOBILES WITH EXHAUST BRAKE

BACKGROUND OF THE INVENTION

1. Field of the Invention

This invention relates to an automatic transmission for automobiles with exhaust brake and, more particularly, to a control method of the automatic transmission which automatically causes downshift in response to an exhaust brake control signal to thereby enhance the exhaust brake effect.

2. Description of the Prior Art

In automobiles with automatic transmission, one of the measures for securing the exhaust brake force is to turn on a lock-up clutch, as disclosed in Japanese Patent Application Laid-Open No. 59-80561. However, the conventional measures provide a poor engine brake effect at a high-speed stage or at a low gear ratio. Especially, in the case of an automatic transmission equipped with a one-way clutch, the one-way clutch functions as a free wheel at the time of coasting, hence, the engine brake is scarcely effective and the burden of a foot brake becomes heavy in order to supplement the braking force. Consequently, it will be tried to enhance the effect of the engine brake by turning on an exhaust brake control means and controlling the shift lever of the automatic transmission to achieve downshift, but, such a procedure needs the successive steps of turning on the exhaust brake control means and performing downshift control, as a result, the driver's attention drops, hence, such circumstances are undesirable for safety driving.

That is, the conventional measures need to control the exhaust brake and to perform downshift of the shift lever, thus, such manipulation is troublesome, thereby leaving a question in safety driving.

SUMMARY OF THE INVENTION

It is an object of the present invention to solve the inconveniences of the prior art, thus to provide a control method of an automatic transmission for automobiles with exhaust brake which automatically causes downshift of a speed change means in response to the turn-on action of an exhaust brake control means.

To achieve the foregoing object, the present invention provides a control method which causes downshift when a control signal is given from an exhaust brake control means by an automatic speed change means if the degree of throttle opening is indicated as zero and if it is judged that a downshift point is not yet passed over.

According to the present invention, in response to the turn-on action of the exhaust brake control means, the automatic transmission is downshifted, for example, from 4th speed to 2nd speed. As a result, the gear ratio increases naturally, thus, the engine brake in addition to the exhaust brake is made active, thereby a large braking force is secured.

BRIEF DESCRIPTION OF THE DRAWINGS

FIG. 1 is a flowchart showing a control system of the present invention;

FIGS. 2 and 3 are diagrams showing downshift patterns;

FIG. 4 is a diagram explanatory of a gear train of an automatic transmission;

FIG. 5 is an explanatory diagram showing an electric control system and an hydraulic control system used in the present invention.

DESCRIPTION OF THE PREFERRED EMBODIMENTS

Figure 6:
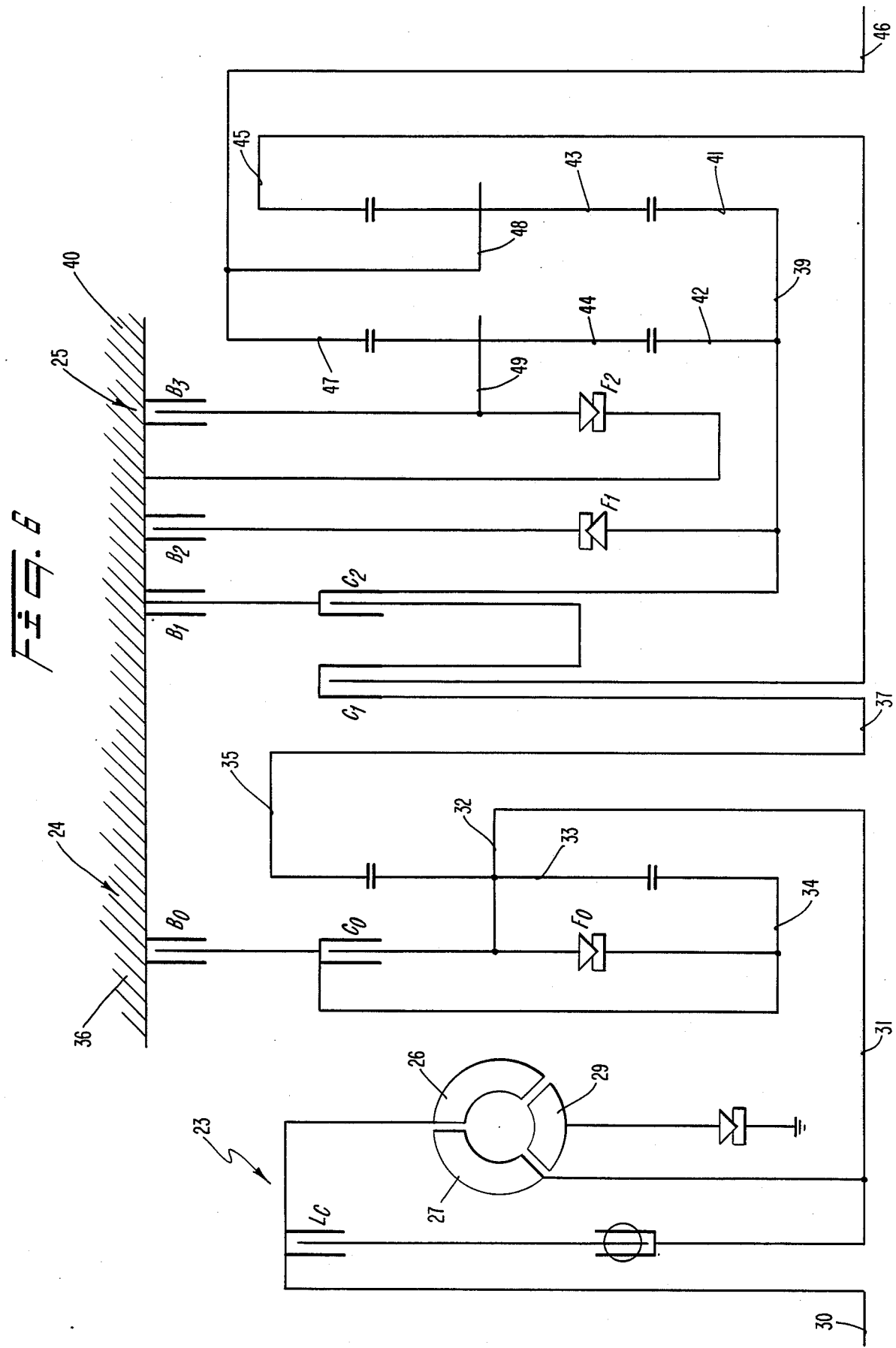
FIG. 6 is an explanatory diagram showing another example of the gear train of the automatic transmission.

An example of a control block used in the present invention is shown in FIG. 1.

As an exhaust brake control switch is turned on, if the degree of throttle opening is zero, it is judged or determined whether or not a downshift pattern is to be selected. If the speed change pattern currently effective corresponds not to the downshift pattern of FIG. 2, but to the downshift pattern of FIG. 3, the downshift pattern of FIG. 2 is selected. The current car speed is detected and the car speed thus detected is compared with the downshift pattern. Because the downshift point of the downshift pattern is set within a zone of not causing the engine to overrun even if downshift is actually performed, it is judged whether or not jumping downshift is permitted. Finally, the extent of downshift is determined.

An example of performing downshift will now be described. The epicyclic gearing speed change mechanism of the automatic transmission includes a one-way clutch in one case and not in the other case. Control in either case of the exhaust brake will be described.

FIG. 4 shows the epicyclic gearing speed change mechanism for the automatic transmission, not employing the one-way clutch. A torque converter 1 includes a pump 2, a turbine 3, and a stator 4. The pump 2 is fixed to a crankshaft 5 on the side of the engine, and the turbine 3 is coupled with an input shaft 6. A clutch C1 is disposed between the input shaft 6 and a countershaft 7, and another clutch C2 is disposed between a first carrier 9 rotatably supporting a first planetary pinion 8 and the input shaft 6. A brake B1 is disposed between the carrier 9 and a case 10. A first sun gear 11 supported by the countershaft 7 is in gear via the first planetary pinion 8 with a first ring gear 12, and a brake B2 is provided between the first ring gear 12 and the case 10. A sun gear shaft 14 of a second sun gear 13 is coupled with the first carrier 9. The second sun gear 13 is in gear via a second planetary pinion 15 with a second ring gear 16, and this ring gear 16 is supported by the countershaft 7. A second carrier 17 rotatably supporting the second planetary pinion 15 is coupled with a third carrier 19 rotatably supporting a third planetary pinion 18. A third sun gear 20 gearing with the third planetary pinion 18 is supported by the countershaft 7, and a brake B3 is disposed between a third ring gear 21 gearing with the third planetary pinion 18 and the case 10. The third carrier 19 is coupled with an output shaft 22.

By the use of the combination of gears as above, several speeds listed in Table 1 are obtained by controlling engagement/disengagement of each clutch and each brake.

TABLE 1

|     | Clutch | | Brake | | | Solenoid Valve for gear shift | |
| --- | --- | --- | --- | --- | --- | --- | --- |
|     | C1 | C2 | B1 | B2 | B3 | S1 | S2 |
| R$_{EV}$ | X |    | X  | X  | O  | X  | X  |
| N   | X  | X  | X  | X  | O  | X  | X  |
| 1ST | O  | X  | X  | X  | O  | X  | O  |
| 2ND | O  | X  | X  | O  | X  | O  | O  |
| 3RD | O  | X  | O  | X  | X  | O  | X  |

TABLE 1-continued

| | Clutch | | Brake | | | Solenoid Valve for gear shift | |
|---|---|---|---|---|---|---|---|
| | C1 | C2 | B1 | B2 | B3 | S1 | S2 |
| 4TH | O | O | X | X | X | X | X |

In Table 1, symbol "O" designates actuation and symbol "X" designates non-actuation (release).

Of course, each clutch and each brake listed in Table 1 are actuated/non-actuated (released) by means of a hydraulic control circuit. An example of the hydraulic control circuit is disclosed, for example, in Japanese Patent Application Laid-Open No. 61-165055, hence its detailed description is omitted here, but, its fundamental idea is shown in FIG. 5. As will be apparent from FIG. 5, a shift valve communicating with a first solenoid valve S1 controls the third brake B3, paired shift valves controlled by a second solenoid valve S2 communicate with the clutch C2, brakes B1 and B2, and an oil path coming from a hydraulic control valve communicates with the clutch C1. As will be apparent from Table 1, downshift is realized by controlling the solenoid valves S1 and S2. For example, if both the solenoid valves S1 and S2 are turned on (as indicated by symbol "O") while the automobile is running at 4th speed in the range D, the second clutch C2 is released and the second brake B2 is actuated, thereby resulting in 2nd speed. As a result, the gear ratio increases, for example, from 1.000 to 2.454, and the engine brake in addition to the exhaust brake becomes effective. A solenoid drive circuit for actuating each solenoid valve S1, S2 is connected with a speed change control circuit in which a means for performing the process shown in FIG. 1 is assembled. As shown further in FIG. 5, to an exhaust brake control circuit are applied input signals given from a throttle sensor, a car speed sensor, and an exhaust brake control switch. In response to these input signals the exhaust brake control circuit gives its output to an exhaust brake actuator drive circuit to thereby actuate an exhaust brake actuator.

FIG. 6 shows an example of the epicyclic gearing speed change mechanism usable in the automatic transmission employing the one-way clutch. This automatic transmission includes a torque converter 23, an overdrive mechanism 24, and a gear mechanism 25 of three forward speeds and one reverse speed.

The torque converter 23 is of the known configuration including a pump 26, a turbine 27, and a stator 29, and is equipped with a direct-coupled clutch LC. The pump 26 is directly coupled with a crankshaft 30 on the side of the engine, and the turbine 27 is coupled with a turbine shaft 31 functioning as the input shaft. This turbine shaft 31 is directly coupled with a carrier 32 of the overdrive mechanism 24. A planetary pinion 33 rotatably supported by the carrier 32 is in gear with a sun gear 34 and a ring gear 35. Between the sun gear 34 and the carrier 32 are disposed a multi-disk clutch C0 and a one-way clutch F0 in series. A multi-disk brake B0 is provided between the sun gear 34 and a case 36 for the overdrive mechanism.

The ring gear 35 of the overdrive mechanism 24 is coupled with an input shaft 37 of the epicyclic gear mechanism 25, a multi-disk clutch C1 for forward running is provided between the input shaft 37 and a countershaft 38, and another multi-disk clutch C2 for reverse running is provided between the input shaft 37 and a sun gear shaft 39. Between the sun gear shaft 39 and a case 40 for the epicyclic gear mechanism are provided multi-disk brakes B1 and B2 and one-way clutch F1. Sun gears 41 and 42 provided on the sun gear shaft 39 are in gear with planetary pinions 43 and 44 forming a two-row single planetary pinion, one planetary pinion 43 is in gear with a ring gear 45, and this ring gear 45 is coupled with the countershaft 38. The other planetary pinion 44 is in gear with a ring gear 47 coupled with an output shaft 46, and this ring gear 47 is coupled via a carrier 48 with the planetary pinion 43. Between a carrier 49 of the other planetary pinion 44 and the case 40 are disposed a multi-disk brake B3 and one-way clutch F2 in parallel.

An example of a hydraulic circuit for controlling actuation and non-actuation of the clutches and brakes assembled as above is disclosed, for example, in Japanese Patent Application Laid-Open No. 59-62753. That Japanese Patent Application (laid open) describes a hydraulic circuit that includes three solenoid valves which receive input from a computer. The computer receives signals from push buttons which indicate the state of operation or condition of the vehicle. The three solenoid valves each have an output port that is connected to a change-over valve and the change-over valve has four output ports associated therewith. When one of the push buttons is actuated, the computer causes certain of the solenoid valves to function which in turn causes hydraulic signals to be emitted from particular ones of the output ports. The hydraulic signals emitted from the output ports are supplied to the hydraulic circuit of an automatic speed change gear and consequently, a desired vehicle traveling condition is obtained.

Several speeds obtained through engagement/disengagement of the aforementioned clutches and brakes are listed in Table 2.

TABLE 2

| Range | Solenoid Valve for range shift | | | Solenoid Valve for gear shift | | Working Factor | | | | | | | One-way Clutch | |
|---|---|---|---|---|---|---|---|---|---|---|---|---|---|---|
| | No. 1 | No. 2 | No. 3 | S1 | S2 | C0 | C1 | C2 | B0 | B1 | B2 | B3 | F1 | F2 |
| Parking (P) | O | | X | X | X | O | X | X | X | X | X | X | | |
| Reverse (R) | X | | O | X | X | O | X | O | X | X | X | X | | |
| Neutral (N) | X | | X | X | X | O | X | X | X | X | X | O | | |
| RANGE D | | | | | | | | | | | | | | |
| 1st | X | X | X | O | X | O | O | X | X | X | X | X | | O |
| 2nd | | | | O | O | O | O | X | X | X | O | X | O | |
| 3rd | | | | X | O | O | O | O | X | X | O | X | | |
| 4th | | | | X | X | X | O | O | X | O | X | | |
| Range 2 | | | | | | | | | | | | | | |
| 1st | O | X | X | O | X | O | O | X | X | X | X | X | | O |
| 2nd | | | | O | O | O | O | X | X | O | O | X | | |
| 3rd | | | O | X | O | O | O | O | X | X | O | X | | |
| Range 1 | | | | | | | | | | | | | | |

TABLE 2-continued

| Range | Solenoid Valve for range shift ||| Solenoid Valve for gear shift || Working Factor |||||||  One-way Clutch ||
|---|---|---|---|---|---|---|---|---|---|---|---|---|---|---|
| | No. 1 | No. 2 | No. 3 | S1 | S2 | C0 | C1 | C2 | B0 | B1 | B2 | B3 | F1 | F2 |
| 1st | O | X | O | O | X | O | O | X | X | X | X | | | |
| 2nd | | | | O | O | O | O | X | X | | | X | | |

For reference, solenoid valves No.1, No.2 and No.3 for range shift indicated in Table 2 correspond, respectively, to the solenoid valves 3, 4 and 5 for range shift shown in Japanese Patent Application Laid-Open No. 59-62753. Further, symbol "O" indicates actuation, "X" indicates non-actuation (release), and " O " indicates the free wheel state at the time of engine brake.

As will be apparent from Table 2, even if a downshift were performed from 4th speed of range D to 2nd speed (both solenoids S1 and S2 for gear shift are turned on), the one-way clutch functions as a free wheel mechanism, thus, the engine brake will not function. Therefore, solenoid valve No.1 for a range shift is actuated to bring about the 2nd speed of range 2 so as to permit an effective engine brake to be actuated. For example, to achieve downshift from 3rd speed of range 2, the solenoid valves are actuated so as to achieve downshift to 2nd speed of range 2 or to 1st speed of range 1 to thereby prevent the clutch from becoming or assuming the free wheel state. Such a control process as above can be realized by incorporating an arithmetic circuit for executing the process shown in FIG. 1 in the computer disclosed in Japanese Patent Application Laid-Open No. 59-62753.

Incidentally, in the case of an operating zone where a large shock will be given if the engine brake in addition to the exhaust brake is made effective while the automobile is running at a high speed, downshift is effected so as not to put the engine brake into action (or so as to result in an operating zone where the clutch stands in the free wheel state).

In a system wherein the exhaust brake is made to turn on/off in interlinked relation to the manual downshift control of the automatic transmission, in order to judge whether the manual shift is downshift or upshift, it is necessary to store the shift position before shift and to compare always with the position after shift. On the contrary, according to the present invention, it is not necessary for the downshift control to detect the shift position. Further, according to the present invention, it is possible to perform downshift while keeping away from the operating zone where a large shock will be given if the engine brake is made effective.

What is claimed is:

1. A control method of an automatic transmission for an automobile with an exhaust brake including automatic speed change means for automatically switching a speed change stage of at least three speeds, an exhaust brake unit with a control means, sensor means for detecting a degree of throttle opening; sensor means for detecting car speed, and means for determining if a downshift point is passed over, including the steps of:
   transmitting a signal from said exhaust brake control means which indicates a particular condition of an exhaust brake control switch;
   detecting said degree of throttle opening so as to determine whether a particular downshift pattern should be selected;
   detecting said car speed by said sensor means for detecting car speed
   selecting a downshift pattern that is to be compared with said car speed;
   comparing the detected car speed and the selected downshift pattern and determining from that comparison whether a downshift point is to be passed over; and
   downshifting the automatic transmission by said automatic speed change means in response to said signal transmitted from said exhaust brake control means and thereby effecting an engine braking force.

* * * * *